United States Patent [19]

Chen et al.

[11] Patent Number: 5,739,883
[45] Date of Patent: Apr. 14, 1998

[54] MANUFACTURING METHOD AND STRUCTURE FOR ALIGNER OF LIQUID CRYSTAL DISPLAY

[75] Inventors: Kun-Ti Chen, Tainan; Bing-Ming Ho, Chiayi, both of Taiwan

[73] Assignee: Nan Ya Technology Corporation, Taipei, Taiwan

[21] Appl. No.: 705,731

[22] Filed: Aug. 30, 1996

[51] Int. Cl.⁶ .................................................. G02F 1/1337
[52] U.S. Cl. .......................... 349/124; 349/128; 349/129
[58] Field of Search ................................. 349/123, 124, 349/126, 128, 129, 132, 136; 428/1; 430/5, 20

[56] References Cited

U.S. PATENT DOCUMENTS

| | | | |
|---|---|---|---|
| 4,725,517 | 2/1988 | Nakanawatari et al. | 349/124 |
| 5,438,421 | 8/1995 | Sugawara et al. | 349/124 |
| 5,446,569 | 8/1995 | Iwai et al. | 349/124 |
| 5,473,455 | 12/1995 | Koike et al. | 349/124 |
| 5,486,403 | 1/1996 | Ishitaka et al. | 428/1 |
| 5,504,604 | 4/1996 | Takatori et al. | 349/123 |

FOREIGN PATENT DOCUMENTS 4-037719   2/1992   Japan .................................. 349/129

Primary Examiner—William L. Sikes
Assistant Examiner—Tai V. Duong
Attorney, Agent, or Firm—Bacon & Thomas

[57] ABSTRACT

This invention is directed to a manufacturing method and a new structure of a LCD aligner. The aligner is obtained by using transparency gradually changed mask for lithographic exposure. The LCD aligner made by this method has the function of both multidomain division and that of the retardation film. The advantages of LCD aligners made this way includes: simpler fabrication process, less cost, improved contrast ratio, reduced interference color, etc. Besides enhancing the color resolution of the screen, it also extends the viewing angle of the screen.

4 Claims, 19 Drawing Sheets bottom aligner top aligner

Embodiment 1

Embodiment 2

MANUFACTURING METHOD AND STRUCTURE FOR ALIGNER OF LIQUID CRYSTAL DISPLAY

BACKGROUND OF THE INVENTION

1. Field of the Invention

This present invention relates generally to a method for forming a liquid-crystal-display (LCD) aligner, and in particular, to the formation of a LCD aligner with pretilt angles which are patterned by employing a mask with gradually changing transparency for lithographic exposure and etching processing. This method can dramatically reduce the number of process steps in making the LCD aligner and hence reduce the overall manufacturing cost of producing LCDs.

2. Descriptions of the Prior Art

Flat display technology is taking various forms today, including the Field Emission Display (FED), Plasma Display (PD) and Liquid Crystal Display (LCD). The LCD technology is the best developed among these. Its importance can be inferred from the geometrical growth of yearly sales revenue of products containing LCDs. The so called Thin Film Transistor LCD (TFT LCD) have good qualities which allow it to compete with Cathode Ray Tube (CRT) containing devices. However, one problem associated with LCD's is their limited viewing angle, while CRTs are notoriously bulky and heavy.

A conventional TFT LCD has a large number of liquid crystal molecules piled up between top and bottom aligners, the arrangement of the liquid crystal molecules is subject to change when an electric field is applied to the liquid crystal molecules which force the molecules to change their orientation which controls the amount of light passing through the molecules. The operation principle of an LCD is described in the following paragraph.

As shown in FIG. 1 (A), incident light A is polarized after passing the polarizer B when no voltage is applied across the two electrodes. The liquid crystal molecules C rotate this polarized light 90 degrees to pass through a second polarizer D, which is 90 degrees out of phase with the polarizer B. This successful passage of light results in a bright spot represented by the arrowhead in FIG. 1(A).

However, as shown in FIG. 1(B), the liquid crystal molecules are forced to pile up by the electric field generated when a voltage is applied across the two electrodes. Therefore, the liquid crystal molecules change their orientation and will not rotate the light and allow it to pass through the second polarizer D and this phenomenon results in a black spot, that is, the absence of transmitted light.

The main axes of the liquid crystal molecules align with a 90 degree rotation under the effect of aligners. Because the ditch (alignment) direction of the top and bottom aligners are orthogonal to each other, the confined liquid crystal molecules will stack up rotationally to fit the different ditch or aligner direction of the upper and lower alingners. Consequently, aligners play a key role in the operation of an LCD.

Aligners are conventionally formed by vacuum sputtering or a rubbing method. The rubbing method is currently the more popular method used in the mass production of aligners. As shown in FIG. 2, the rubbing method produces grooves or ditches (G) in one direction only, which is the rubbing direction. This is shown in FIG. 2(B). However, if the ditches for each pixel are formed in one rubbing direction only, there will be vertical viewing angle dependence problem when viewing the LCD. That is, the light transmission ratios are different with applied voltage higher than 2 V at different viewing points (or angles) A1, A2 and A3, as shown in FIGS. 3(A) and 3(B). Thereafter, the viewer will experience nonequivalent contrast as well as a decrease in sharpness at different viewing angles, as shown in FIG. 3(C). Moreover, this figure also shows the lack for symmetry and wide viewing angle.

The manufacture of two or multi-domain aligners was developed to overcome this problem. As shown in FIG. 4(A), each pixel has two domains, H and I, with different or opposite rubbing directions of the aligner ditches. Due to the mutual compensation for viewing characteristics provided by the two domains, in the vertical direction, the LCD will give distinct images in a wide viewing range. The LCD using two or multi-domain aligners showed tremendous improvement in terms of contrast, as shown in FIG. 4(B). But the method requires multiple rubbing steps, as shown in FIG. 4(C), which is both time consuming and costly.

Another problem in LCD manufacture is the compensation for multi-frequency light. This problem arises from the use of multi-frequency light such as white light as the light source. When the different frequency light passes through the first polarizer, it incidents into the liquid crystal molecules in the same polarizing direction. After passing through the liquid crystal molecules, the polarizing direction of different frequency light will be rotated to different direction. After the different frequency light with different polarizing frequency passes the second polarizer, the different frequency light will have different intensity. As a solution to this problem, a method which employs a retardation film which compensates the difference of rotating angles and improves color contrast, as shown in FIG. 5(A), is used. This also helps widen the viewing angle, as shown in FIG. 5(B).

Related technology is described in Okabe, "Wide Viewing Angle TFT-LCDs," Fujitsu Limited, page 105, ASID 93 and Kaneko et al., "Invited Address: Wide-Viewing-Angle Improvements for AMLCDs,"NEC Corp., published on page 265, SID 93 Digest.

SUMMARY OF THE INVENTION

In view of foregoing, and in order to reduce the added expense of LCD production, it is a primary object of the present invention to provide a reliable and easy to use process for forming the LCD aligner. The process steps are described as following:

(1) depositing a layer of polyimide or SiNx onto the LCD electrodes as a pre-etched aligner layer;

(2) coating a layer of photoresist onto the pre-etched aligner layer;

(3) making a photo-mask that has a gradually changing transparency line pattern;

(4) exposing the photoresist with mentioned mask, therefore this photoresist was exposed with lights of varied intensity;

(5) developing the photoresist, therewith using nonselective Reactive-Ion-Etching (RIE) etchback to make an equal depth etching in the vertical direction, then removing part of the photoresist and aligner material;

(6) removing all the remaining photoresist to obtain the aligner.

Another object of this invention is to provide another method to improve the making of the LCD aligner. The process is described as follows:

(1) coating the LCD electrode with a layer of transparent photoresist as the pre-etched layer for the aligner;

(2) making a photo-mask that has a gradually changing transparency line pattern;

(3) exposing the photoresist with the aligner line mask, therefore this photoresist was exposed with lights of varied intensity;

(4) removing part of the resist by developing to obtain the aligner.

It is another object of this invention to find a new structure of the LCD aligner to compensate rotation angle difference for multi-frequency light without employing a retardation film.

BRIEF DESCRIPTION OF THE DRAWINGS

In the accompanying drawings forming a material part of this description, there is shown.

DESCRIPTION OF THE PREFERRED EMBODIMENTS

Figure 1B:
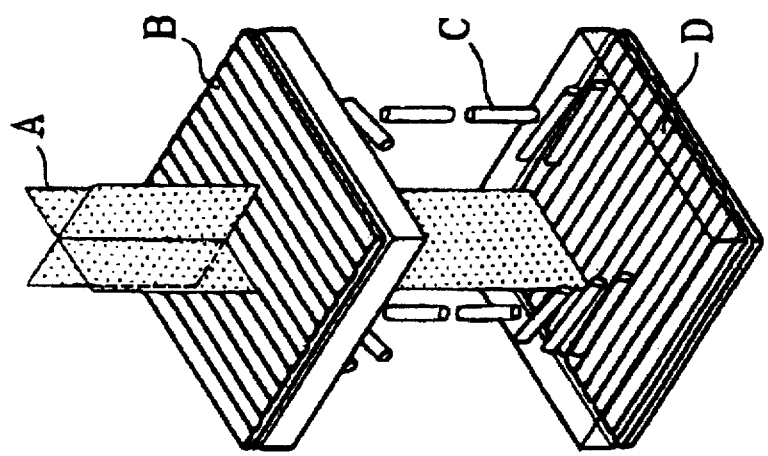
FIGS. 1(A)–(B) show the LCD operation mechanism diagrams; 1(A) shows that bright spot is obtained without applied voltage; 1(B) shows that black spot is obtained with applied voltage.
Figure 1A:
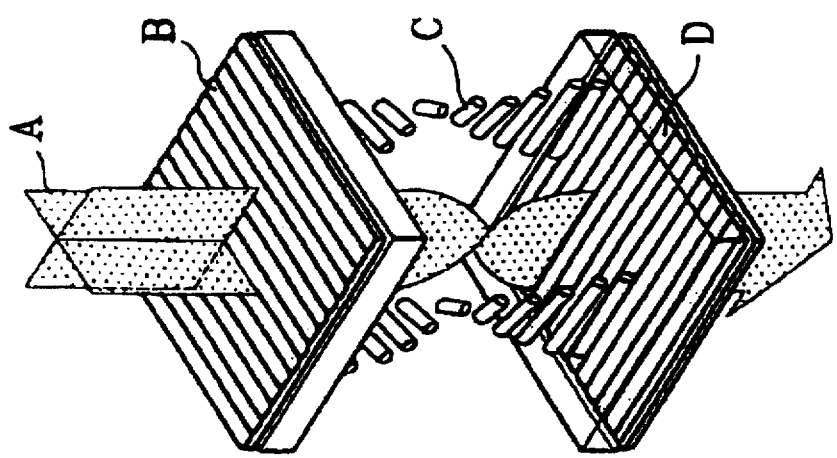
Figure 2A:
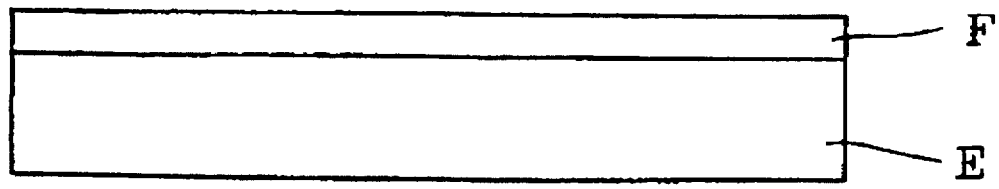
FIGS. 2(A)–(B) are the illustration diagram of the LCD rubbing method, the arrow shows the direction of the rubbing.
Figure 2B:
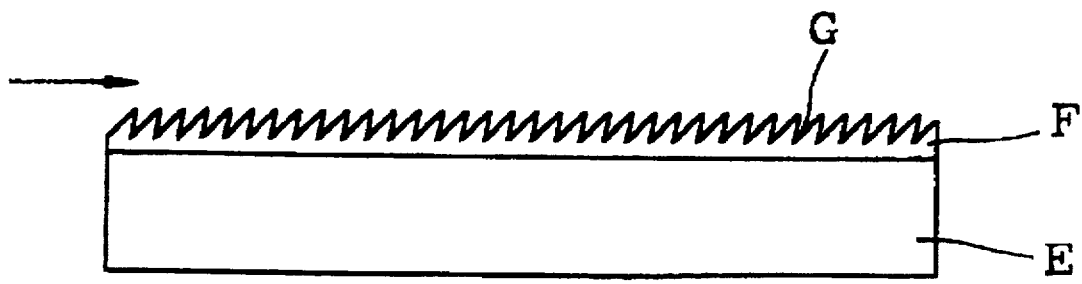
Figure 3A:
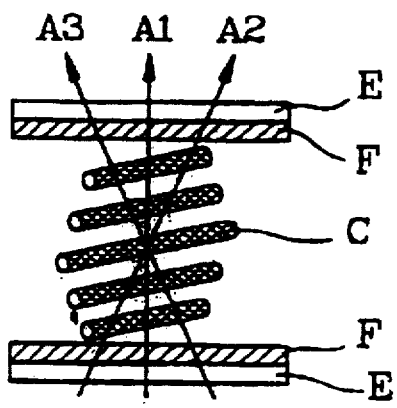
FIGS. 3(A)–(C) shows the drawback of single domain LCD aligner. 3(A) shows the transparency of light measured from different angle A1, A2 and A3; 3(B) shows the transparency ratio unevenness at different angles; 3(C) shows asymmetry of color contrast and viewing angles.
Figure 3B:
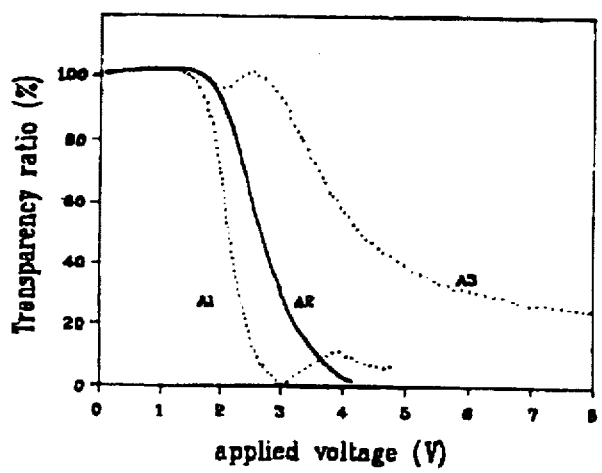
Figure 3C:
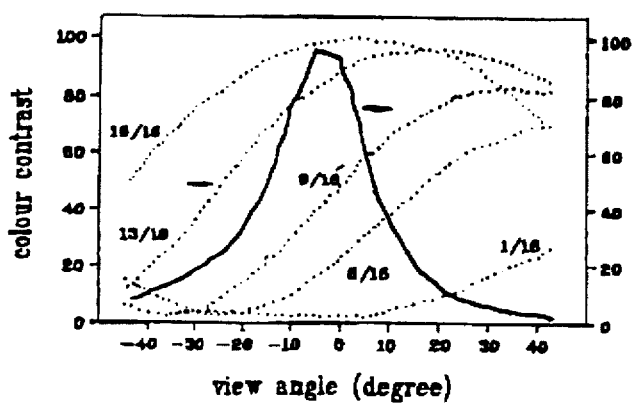
Figure 4A:
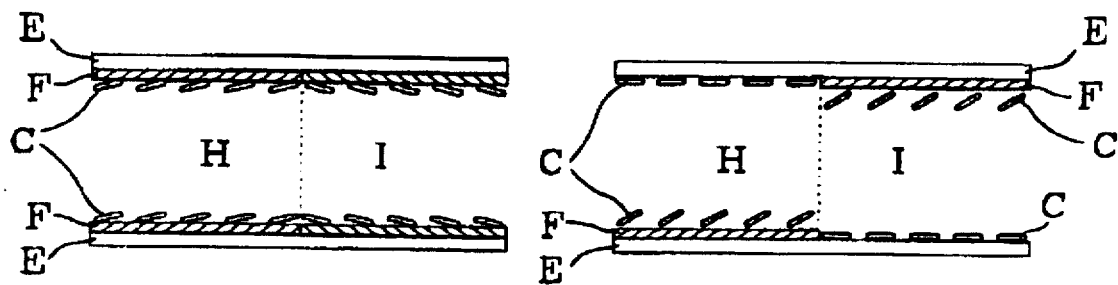
FIG. 4(A) is the cross-sectional representation of the two domain or multi-domain LCD aligner.
Figure 4B:
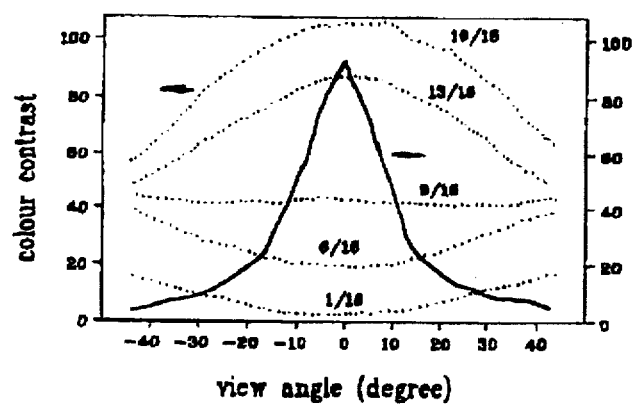
FIG. 4(B) shows the color contrast as a function of viewing angle.
Figure 4C:
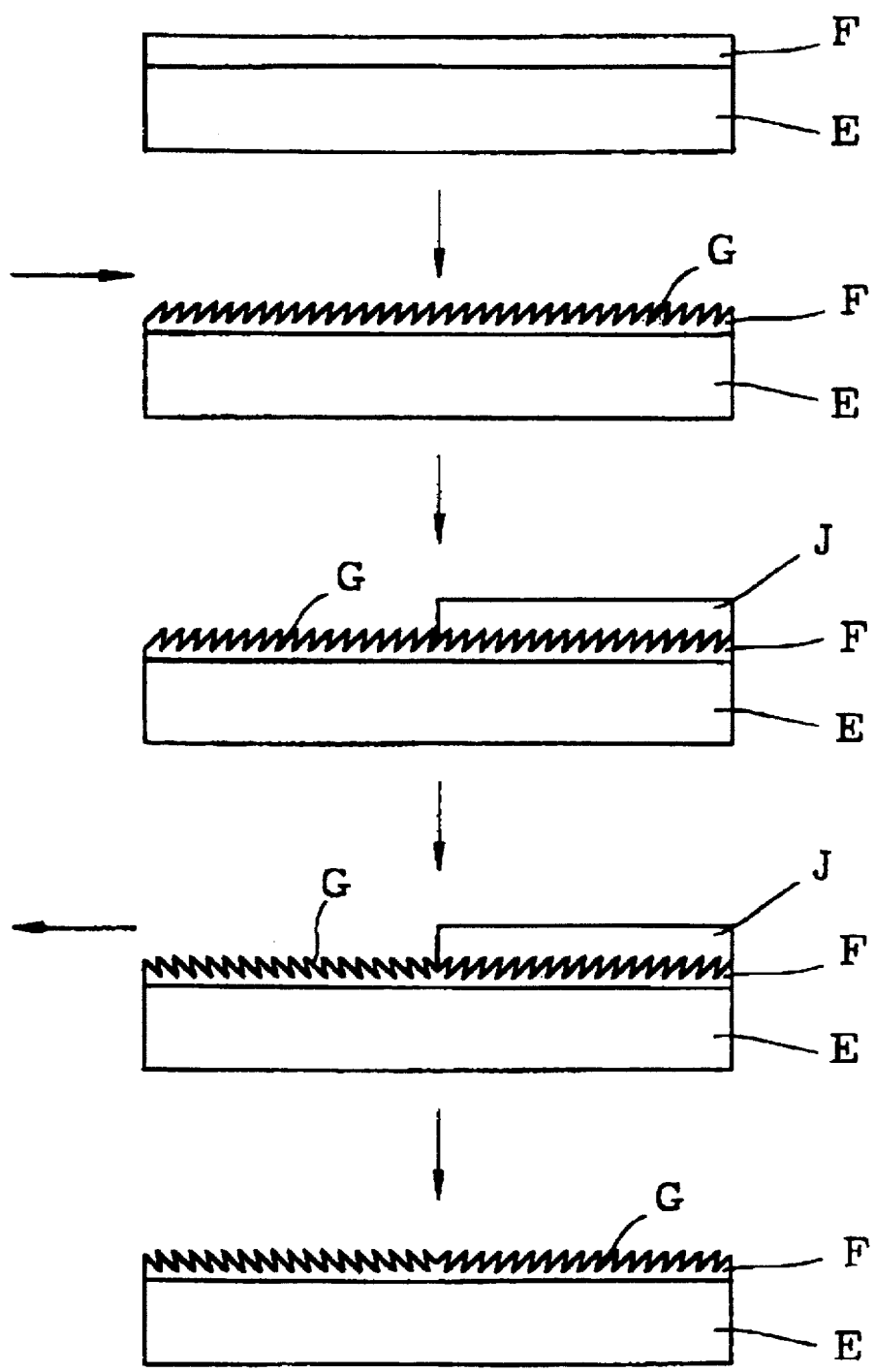
FIG. 4(C) shows the conventional rubbing method for making two-domain or multi-domain LCD aligner.
Figure 5A:
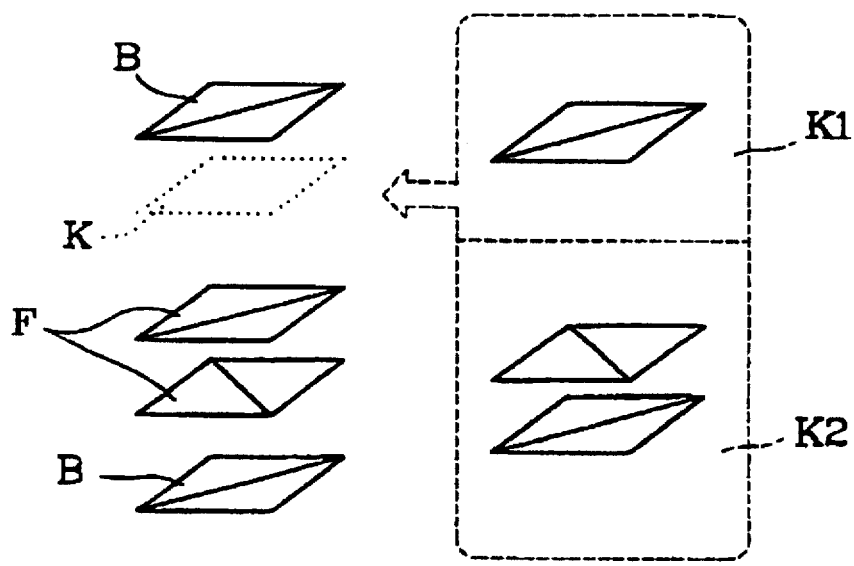
FIG. 5(A) is the illustration diagram of the LCD with one or two layers of retardation film.
Figure 5B:
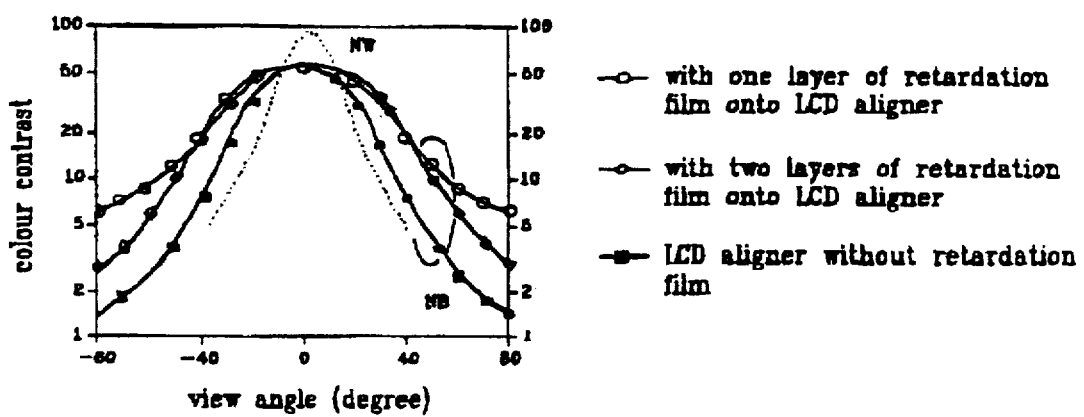
FIG. 5(B) is the plot of the color contrast as a function of viewing angle for LCD aligners with one, two and no retardation film(s)
Figure 6A:
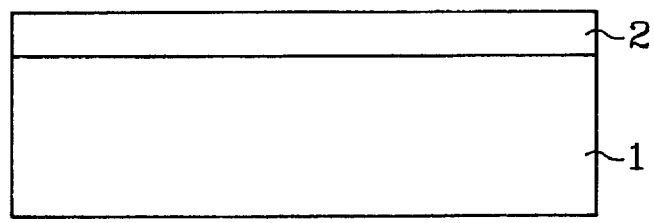
FIGS. 6(A)–(V) are the illustration diagrams to disclose the LCD process proposed in the present invention.

The invention disclosed herein is directed to a method for making LCD aligner, as shown in FIG. 6. The process steps are described as follows:

(1) As shown in FIG. 6(A), a conventional electrode 1 is provided, and a polyimide or SiNx layer 2 having a thickness of 500 to 2000 angstroms is formed on the substrate of the electrode. The exact thickness of this layer depends on the specific use in subsequent processing and application. This layer acts as the aligner layer after the etching process, therefore it is referred as pre-etched aligner layer.

Figure 6B:
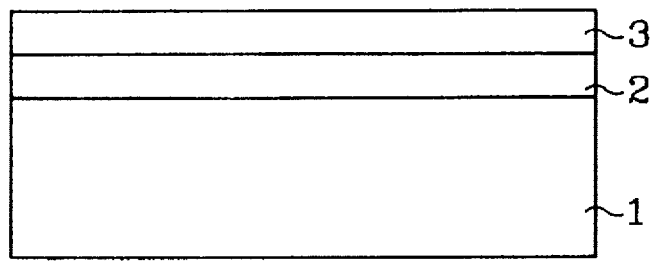

(2) As shown in FIG. 6(B), a layer of photoresist 3 was coated onto the mentioned pre-etched aligner layer and has a thickness between about 5000Å to 12000Å.

Figure 6C:
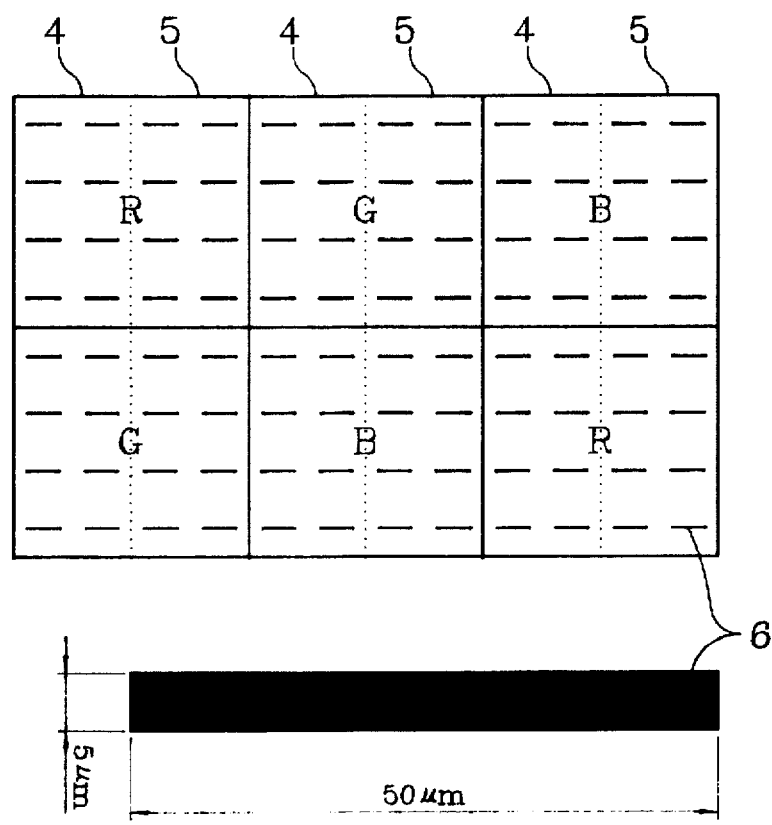

(3) FIG. 6(C) shows the forming process of the photo-mask used to etch the bottom aligner. First, the area on the mask mapping to R.G. B (red, green or blue) color pixel is divided into two domains, labeled domain 4 and domain 5, and second, each domain is disposed with parallel lines 6 to define the aligner ditches. The dimensions of each line pattern is 50 um×5 um.

(4) Two embodiments are disclosed as follows:

Embodiment 1

Figure 6D:
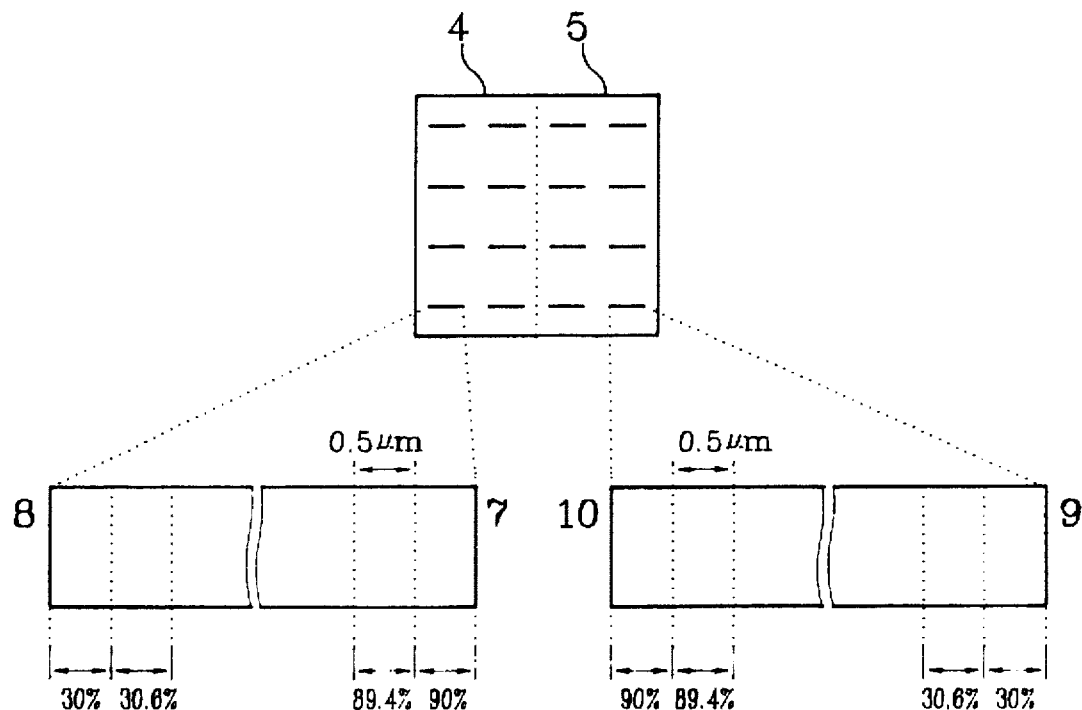
Figure 6E:
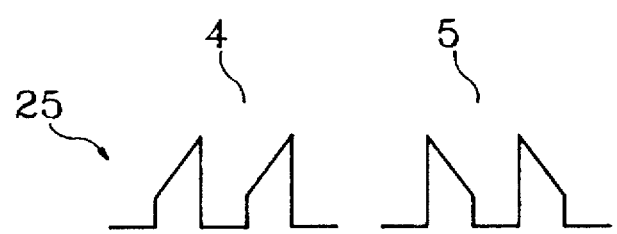

As shown in FIG. 6(D), the variation rates of light transparency for each lines on the mask at domain 4 and domain 5 are the same, and both can be illustrated by FIG. 6(D). In domain 4, the light transparency of starting point 7 with transparency of 90% is decreased 0.6% for each 0.5 micron of movement to the left. The light transparency at point 8 is 30%. In domain 5, the light transparency of starting point 9 with transparency of 30% increases 0.6% for each 0.5 micron movement to the left. The light transparency at point 10 is 90%. The cross-sectional view of light transparency variation for each lines on the mask is shown in FIG. 6(E).

Embodiment 2

Figure 6F:
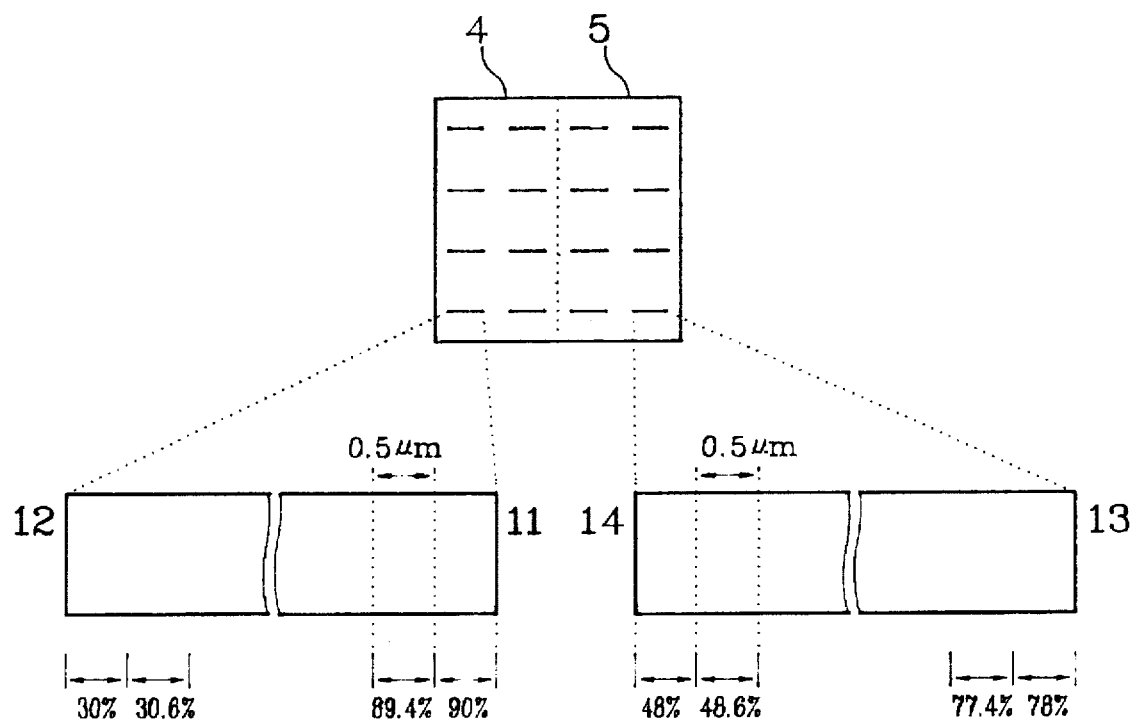
Figure 6G:
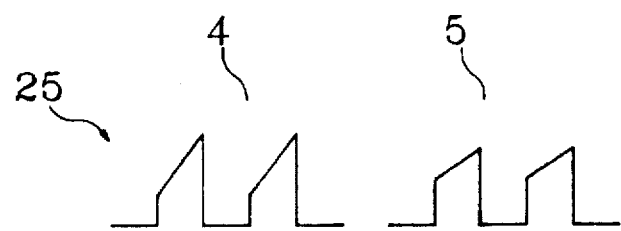

As shown in FIG. 6(F), the variation rates of light transparency for each line on the mask at domain 4 and domain 5 are the same, and both can be illustrated by FIG. 6(F). In domain 4, the light transparency of starting point 11 with transparency of 90% is decreased 0.6% for each micron of movement to the left. The light transparency at point 12 is 30%. In domain 5, the light transparency of starting point 13 with transparency of 78% decreases 0.6% for each 0.5 micron movement to the left. The light transparency at point 14 is 48%. The cross-sectional view of light transparency for each line on the mask is shown in FIG. 6(G).

Figure 6H:
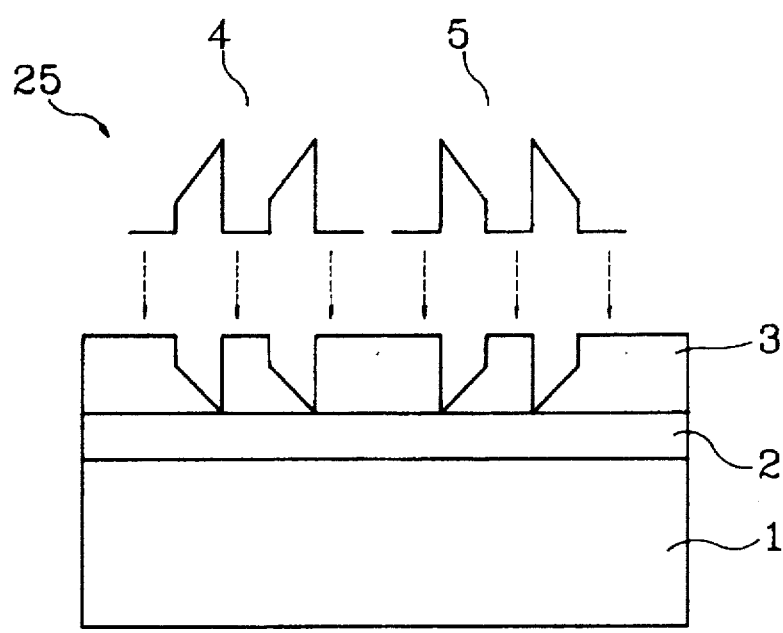
Figure 6I:
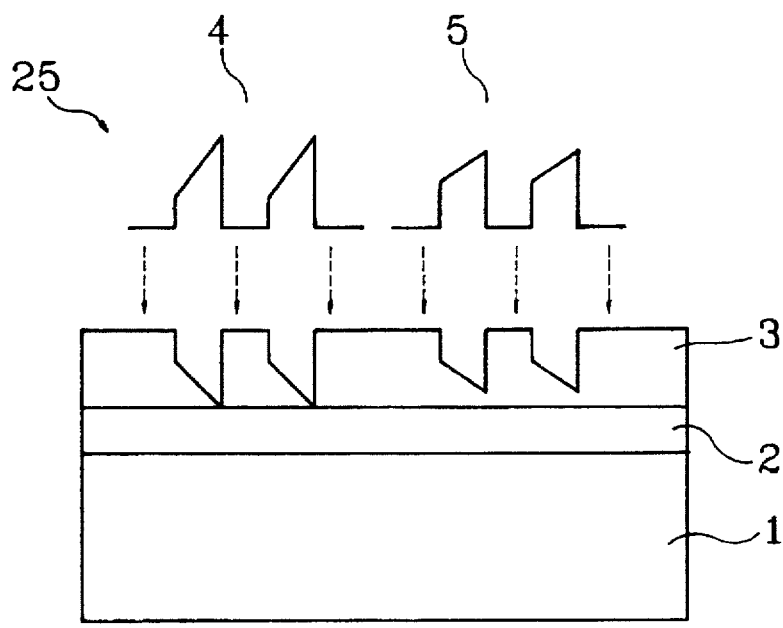

(5) Using the above mentioned photomask to expose and develop the photoresist. Since the lines in each pixel have varying transparency, exposed lines receive varying light intensity which varies photoresist thickness after the developing. Then the aligner layer area for each pixel will have two domains with different directions after the remaining photo-resist is removed. FIG. 6(H) is the cross-sectional view of the LCD electrode after the exposure and develop using the mask from the first embodiment of this invention. FIG. 6(I) is the cross-sectional view of the LCD electrode after the exposure and development by using the mask from the second embodiment of this invention.

Figure 6J:
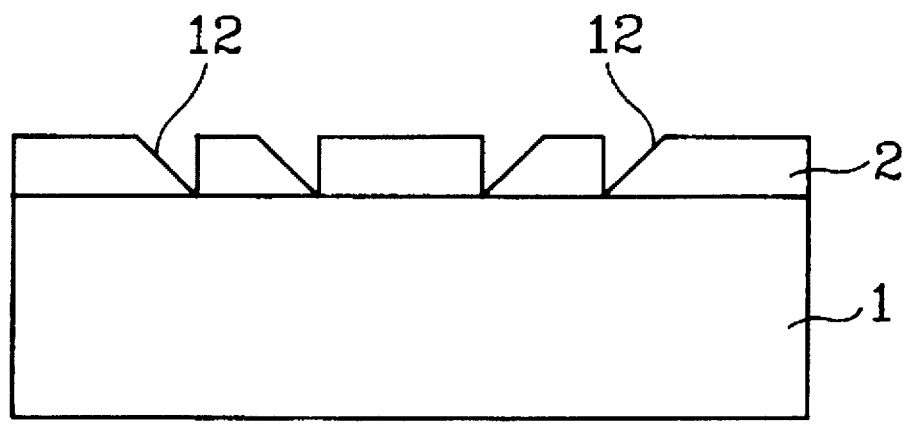
Figure 6K:
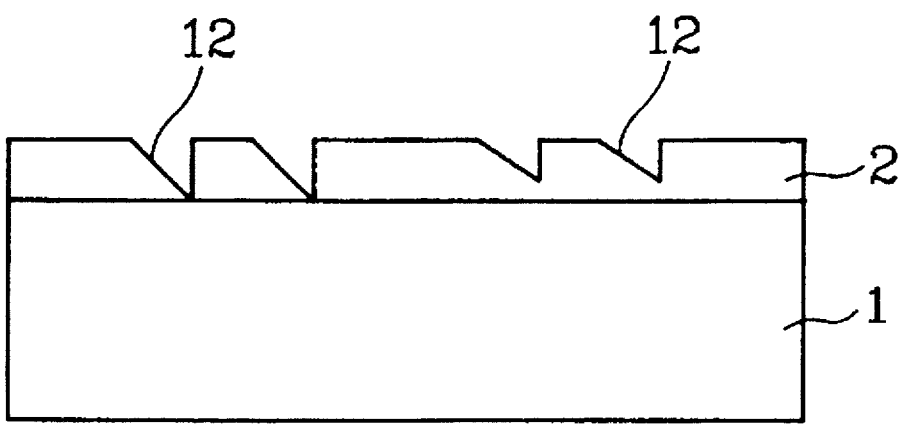

(6) Thereafter applying the non-selective Reactive-Ion-Etching (RIE) to make an equal depth etching in the vertical direction of the LCD aligner. Finally remove the remaining photoresist afterwards to achieve the line pattern desired. FIG. 6(J) is the cross-sectional view of the resultant LCD aligner structure made by using the mask from the first embodiment of this invention. The pixels have symmetric pretilt angle 12; FIG. 6(K) is the cross-sectional view of the resultant LCD aligner structure made by using the mask from the second embodiment of this invention. The pixels have two different pretilt angles 12.

Figure 6L:
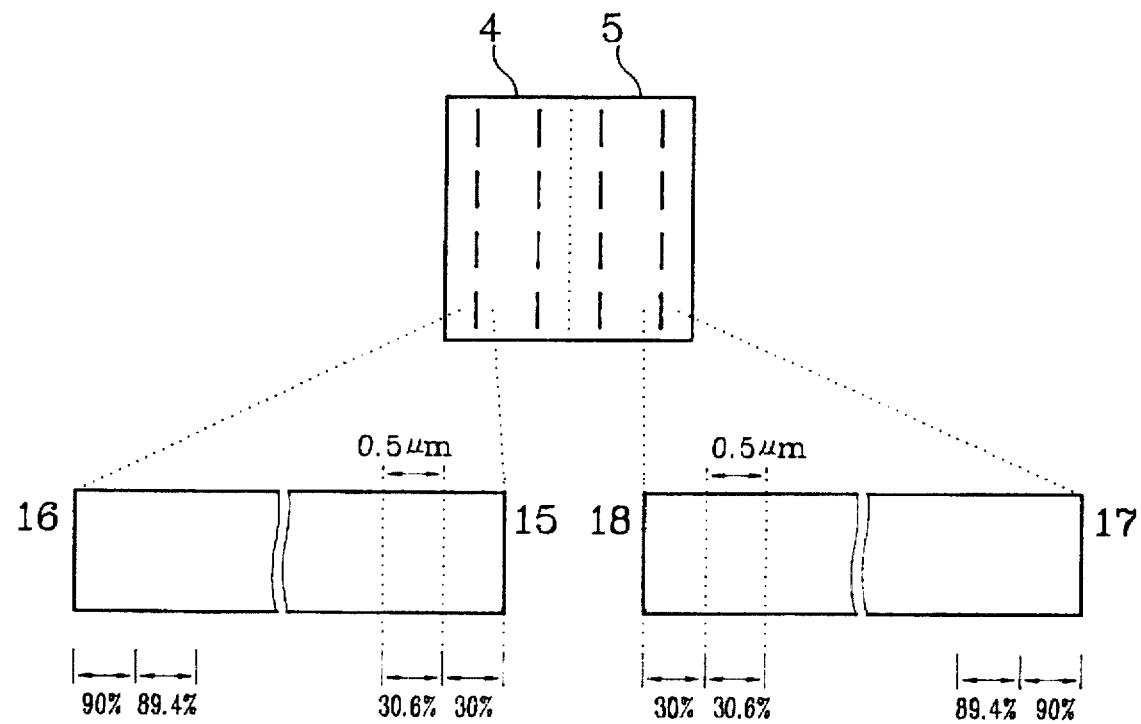
Figure 6M:
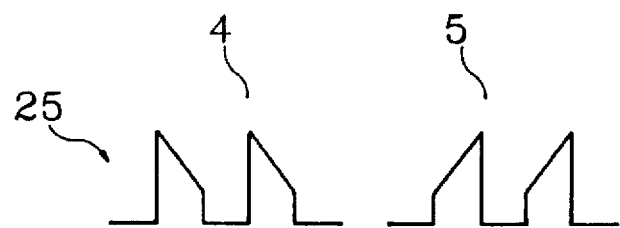
Figure 6N:
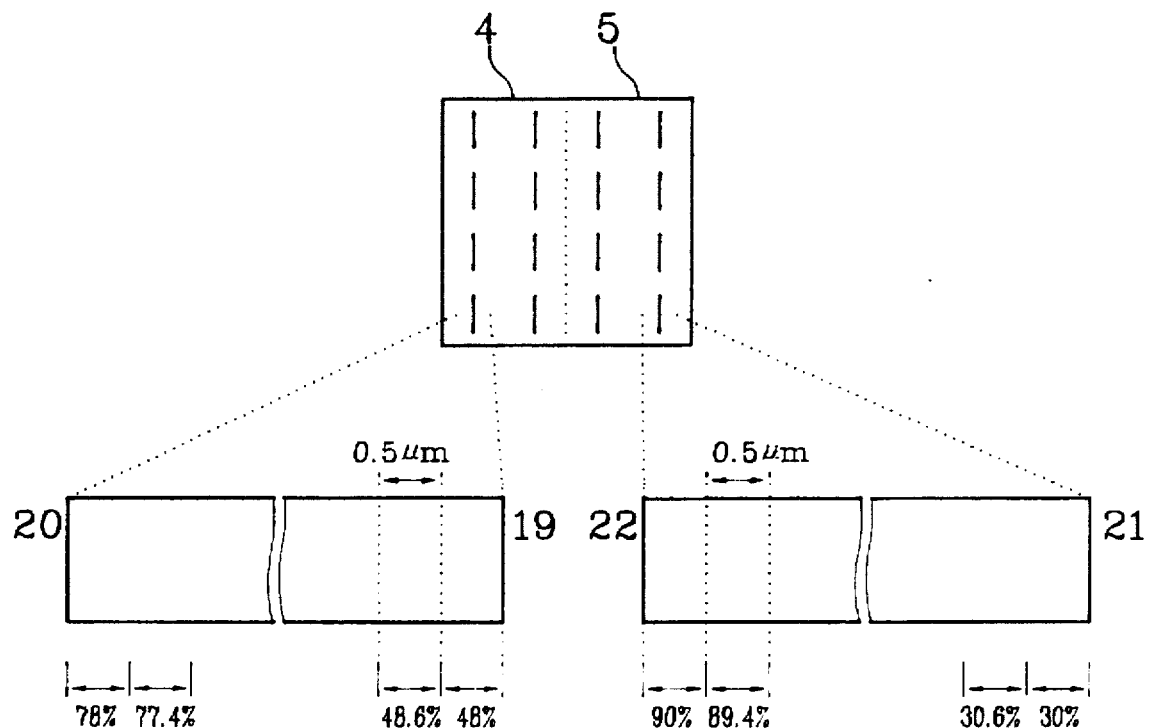
Figure 6O:
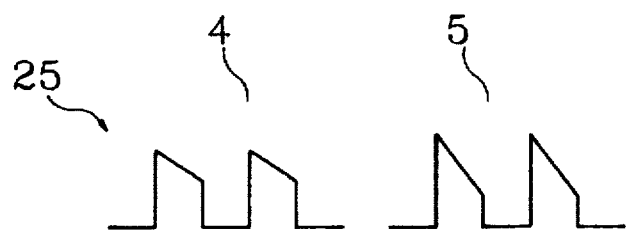
Figure 6P:
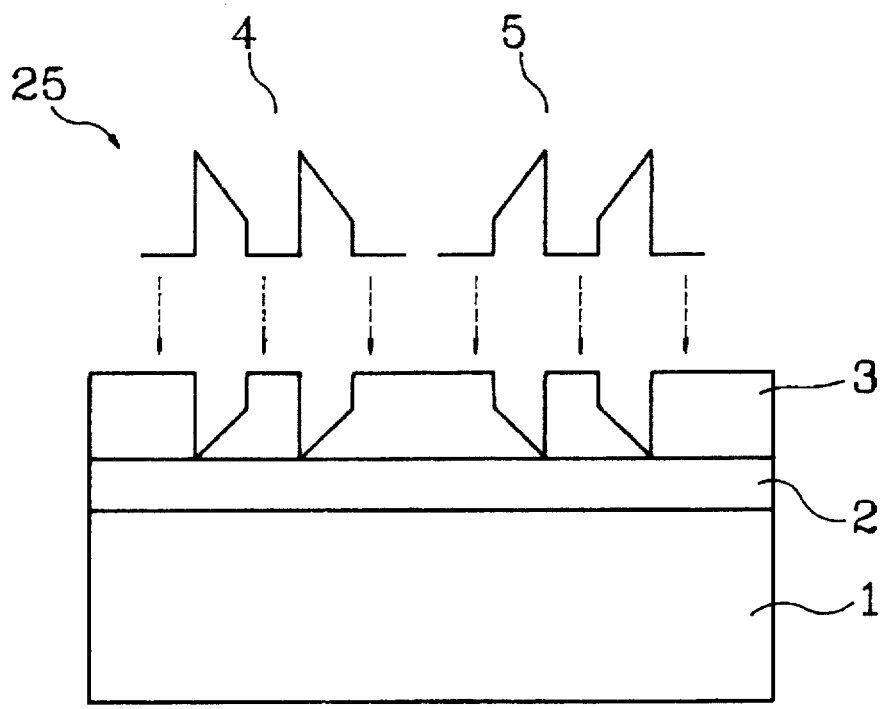
Figure 6Q:
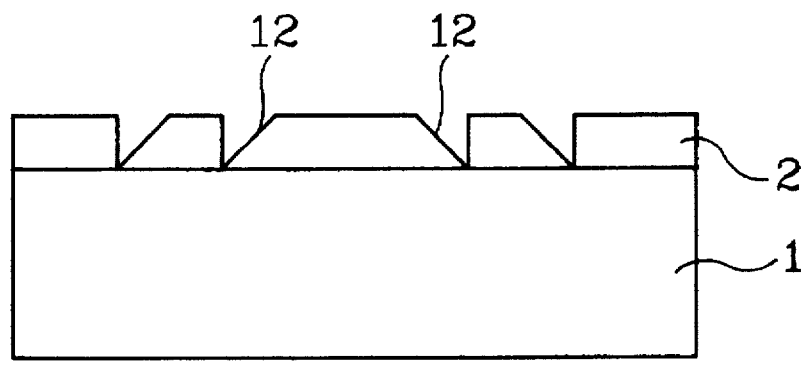
Figure 6R:
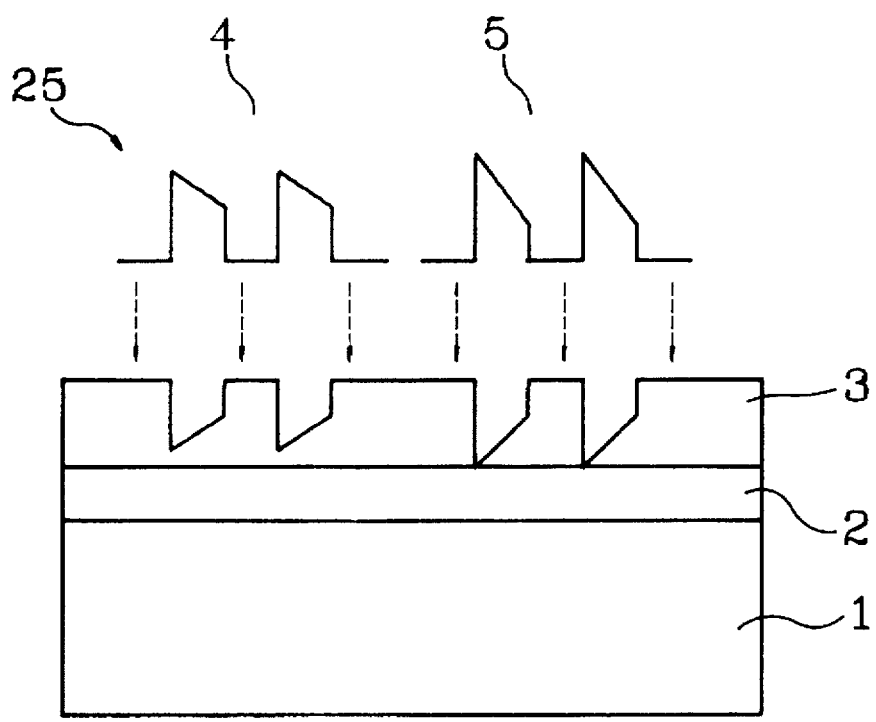
Figure 6S:
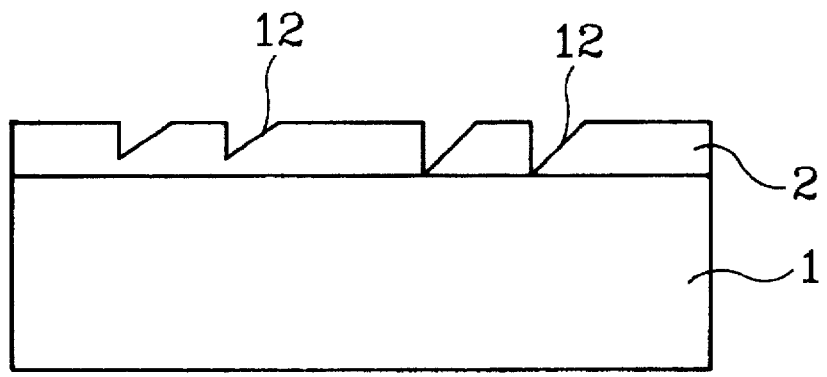
Figure 6T:
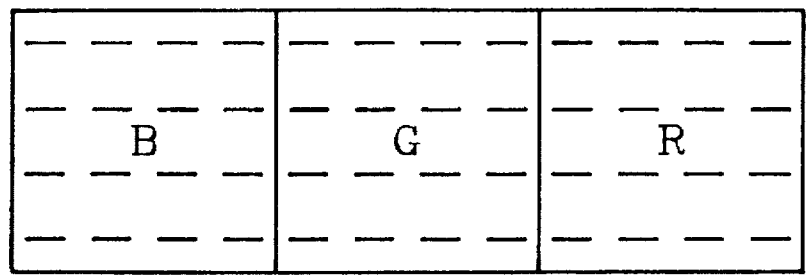
Figure 6T:
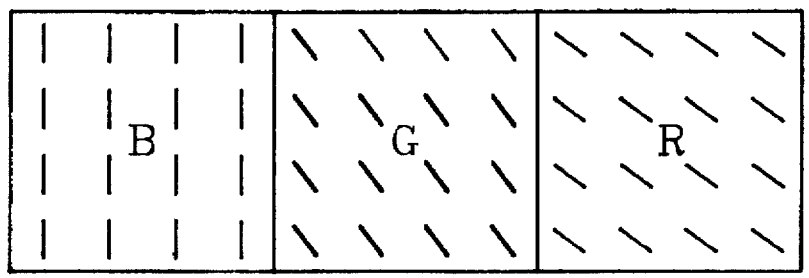
Figure 6T:
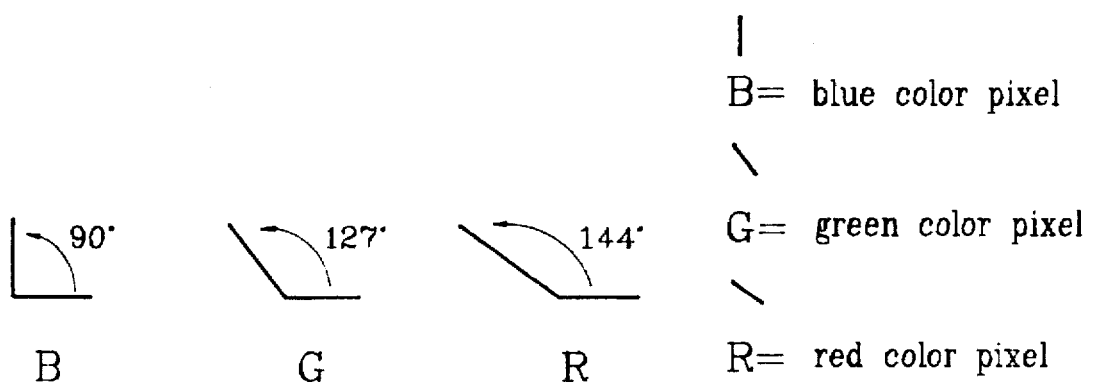

(7) Two different ways for the top aligner photomask are provided as followed:

To operate in embodiment 1, as shown in FIG. 6(L), in domain 5, the light transparency of starting point 17 with transparency of 90% is decreased by 0.6% for each 0.5 micron movement to the left. The light transparency at point 18 is 30%; in domain 4, the transparency of starting point 15 with transparency of 30% is increased by 0.6% for each 0.5 micron movement to the left. The light transparency at point 16 is 90%. The cross-sectional view of light transparency variation for each line on the mask is shown in FIG. 6(M);

To operate in embodiment 2, the variation rates of light transparency for each line on the mask at domain 4 and domain 5 are the same, and both can be illustrated by FIG. 6(N). In domain 4, the light transparency of starting point 19 with transparency of 48% is increased by 0.6% for each 0.5 micron movement to the left. The light transparency at point 20 is 78%; in domain 5, the light transparency of starting point 21 with transparency of 30% is increased by 0.6% for each 0.5 micron movement to the left. The light transparency at point 22 is 90%. The cross-sectional view of light transparency variation for each lines on the mask is shown in FIG. 6(O);

(8) Using the photomask for top aligner of this invention to expose the top LCD electrode 1 coated with aligner material and photoresist. As shown in FIGS. 6(P) and 6(R). Then using non-selective Reactive-Ion-Etching (RIE) etchback to make an equal height etching in the vertical direction of the LCD aligner, and remove the photoresist afterwards to achieve the line pattern desired, as shown in FIGS. 6(Q) and 6(S);

(9) FIG. 6(T) shows the mask for the top aligner. The lines have different rotation angle for light of different color, so the direction of the lines on the mask should be made for pixels of different color. The rotation angle of light of certain frequency can be calculated using the following formula:

$$T=(1+\mu^2)^{-1}\sin^2[\theta(1+\mu^2)^{1/2}]$$

T: transparency % for LCD $$\mu: \pi\delta\Delta n/\theta\lambda$$

θ: rotation angle of Liquid Crystal molecules
λ: wave length of light
Δn=Ne −No, Ne: extraordinary index; No: Ordinary index
D: distance between aligners If T=0 then $\sin^2[\theta(1+\mu^2)^{1/2}]=0$ $\theta(1+\mu^2)^{1/2}=\pi$ $\theta^2(1+\mu^2)=\pi^2$ $\theta^2+\theta^2(\pi\delta\Delta n/\theta\lambda)^2=\pi^2$ $\theta^2=\pi^2[1+(d\Delta n/\lambda)^2]$ $\theta_{red}=144°$ $\theta_{green}=127°$ $\theta_{blue}=90°$ In the above two embodiments, the distance between two aligners is 5 microns, and the wavelength of red, green and blue light is 650, 550 and 450 nm, respectively, and Δn is 0.078. The rotation angle of Liquid Crystal molecules θ can be calculated from red, green and blue light to be 144, 127 and 90 degrees respectively.

Top aligner made this way has taken into consideration the different rotation angles for different color pixel and has the function of retardation film for red, green and blue light.

Figure 6U:
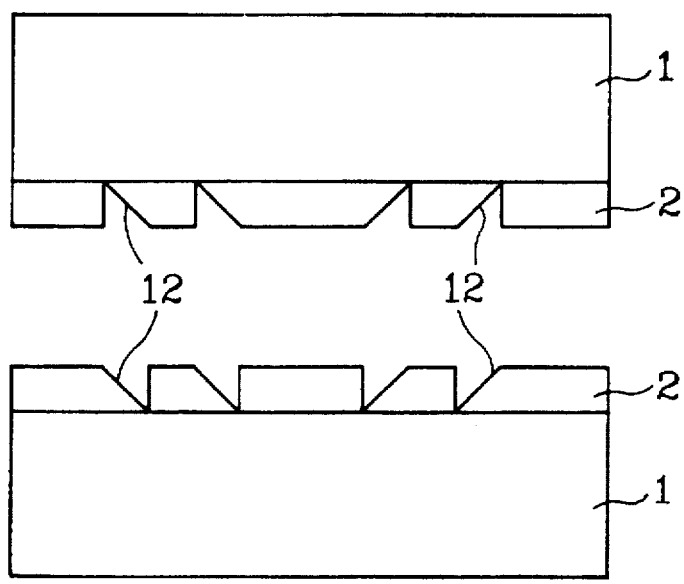
Figure 6V:
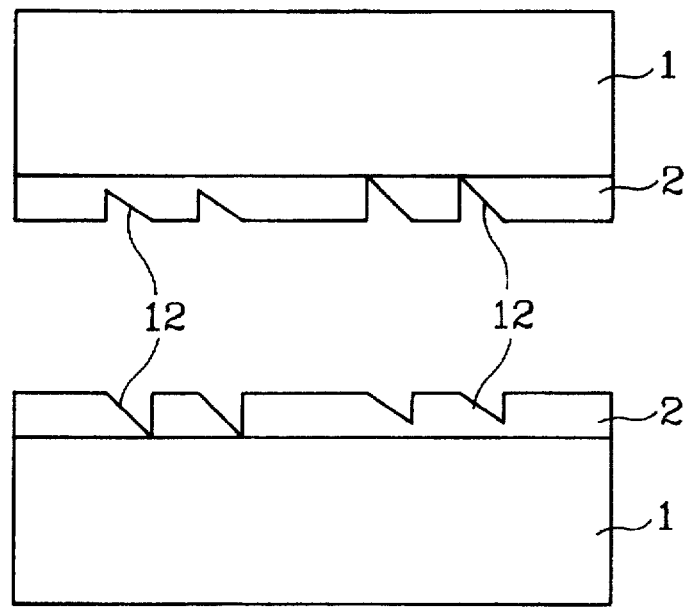

When combining the bottom aligner shown in FIG. 6(J) and top aligner shown in FIG. 6(Q), the embodiment 1 is formed, as shown in FIG. 6(U). When combining the bottom aligner shown in FIG. 6(K) and top aligner shown in FIG. 6(S), the embodiment 2 is formed, as shown in FIG. 6(V).

By using transparent light-sensitive photoresist as preetched aligner, the process steps (2) and (3) shown in FIG. 6(B) can be combined into a single step and the extra steps of photoresist coating and non-selective etchback can be eliminated. In steps shown in FIGS. 6(H), 6(I), 6(P) and 6(R), direct exposure of the transparent photoresist used as pre-etched aligner can be used to simplify the process. This simplified process yields the same structure and property, and is similar to the process described in FIGS. 6(A) through 6(V) except that the extra steps of photoresist coating and non-selective etchback have been eliminated.

Figure 7:
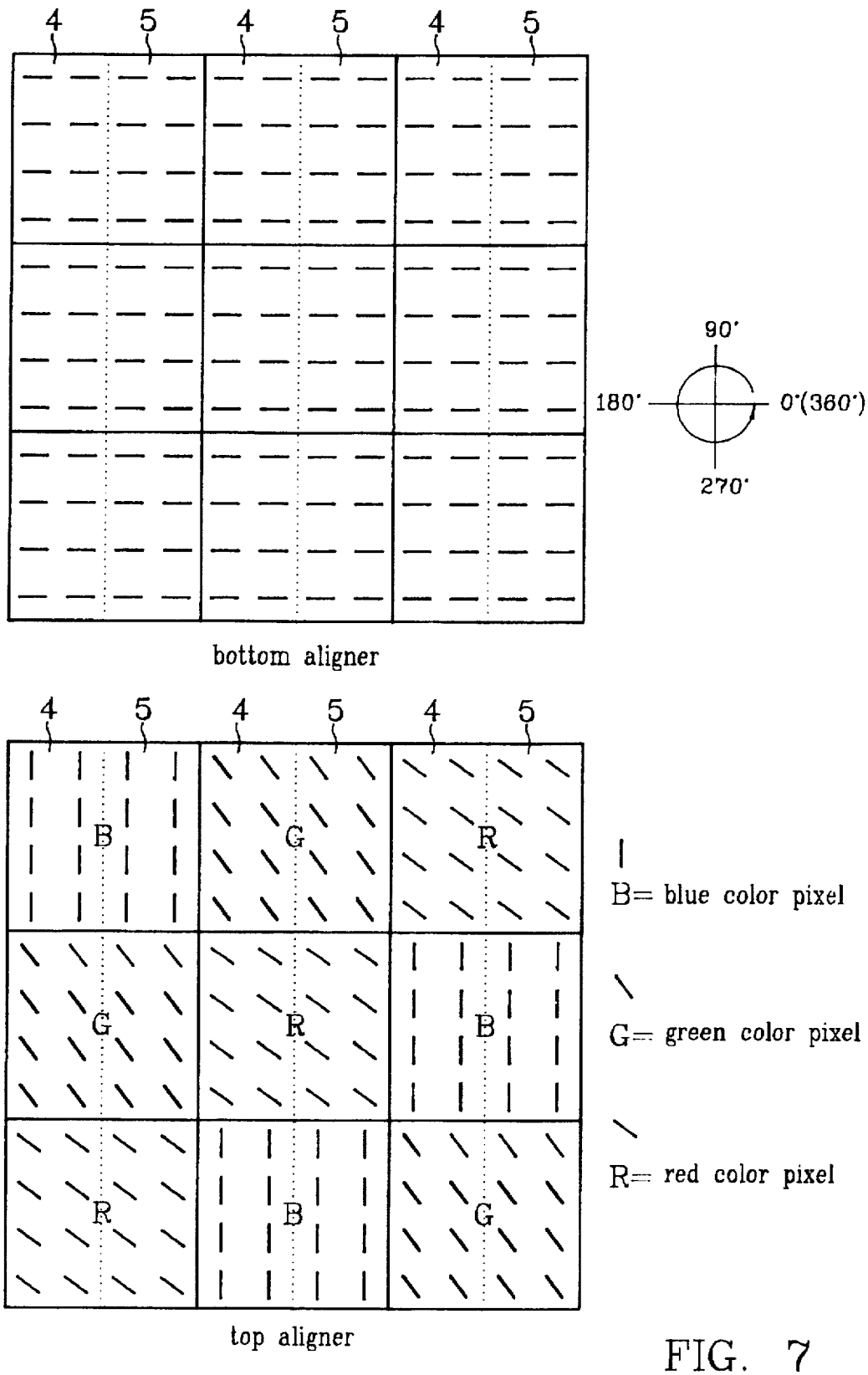
FIG. 7 is the top view of the LCD aligner structure made by the method of this invention.

FIG. 7, shows the top view of the LCD aligner of this invention. The top aligner for different color pixel whose line has different directions. This variation of the angle difference of the lines in different directions is used to achieve retardation for light of different colors.

Figure 8:
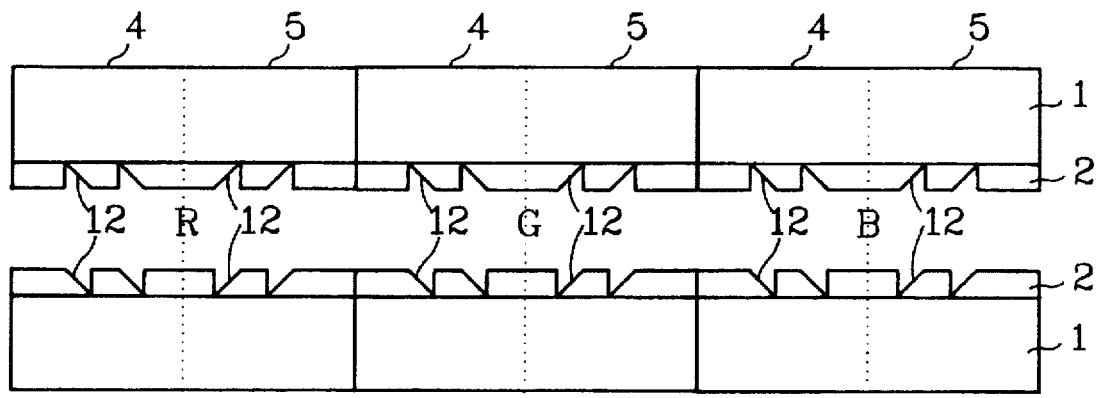
FIG. 8 is the cross-sectional representation of the LCD aligner structure made by the method of this invention.
Figure 8:
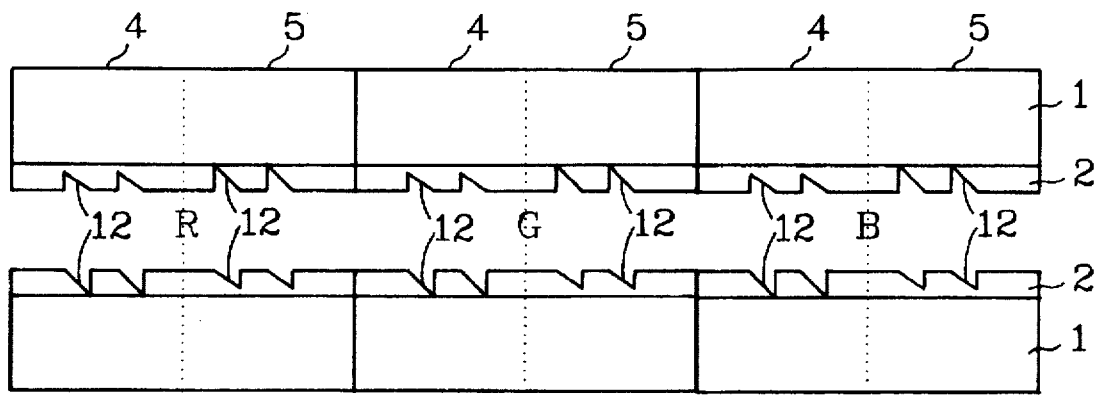

FIG. 8 shows the cross-sectional representation of the LCD aligner of the first and second embodiments. Each colored pixel, (R=red, G=green or B=blue) is divided into two or more domains (domain 4, domain 5, . . . ) and the pretilt angles 12 of the lines in each domain are different.

Comparing with conventional technology, this invention has following advantages:

(1) To make the LCD aligner by using conventional rubbing method requires at least three steps to make multi-domain aligner. However only two lithography steps are needed by the method disclosed of this invention: one on each electrode. This simplifies the process and reduces the cost.

(2) Conventional technology requires one or two extra retardation film(s). The aligner of this invention has the special property of retardation built in and eliminates the step to make the extra retardation film as well as the requirement of extra material and equipment.

(3) Multi-domain aligner and retardation effect are made in one single step simultaneously by the lithography method disclosed in this invention.

(4) Using the LCD aligner of this invention can significantly improve the contrast ratio and reduce the color interference and extend the viewing angle.

While the invention has been particularly shown an described with reference to the preferred embodiments thereof, it will be understood by those skilled in the art that various changes in form and details may be made without departing from the spirit and scope of the invention.

What is claimed is:

1. A method for making a LCD aligner which comprises the following steps:
   (1) forming a pre-etched aligner layer on an electrode substrate;
   (2) coating a photoresist layer on the surface of the pre-etched aligner layer;
   (3) employing a photomask which has a gradually changing transparency line pattern to form a photoresist pattern with different vertical depths;
   (4) using vertical non-selective etching to remove part of said photoresist layer and pre-etched aligner layer;
   (5) removing all the remaining photoresist.

2. The method according to claim 1, wherein said pre-etched aligner layer is selected from the group consisting of polyimide and silicon nitride (SiN)x .

3. The method according to claim 1, wherein said photomask has at least two domains, each domain is mapping to a color pixel and the transparency of line patterns on said photomask of each domain is changing gradually along the longitude direction at the same rate, but at a different rate for each different domain.

4. A method for making a LCD aligner which comprising the following steps:
   (1) coating a photo-resist layer onto an electrode substrate;
   (2) employing a photomask to expose said photoresist layer into at least two domains at once;
   (3) developing the exposed photoresist to form pretilt angle lines of said LCD aligner wherein said photomask has at least two domains, each domain is mapping to a color pixel, and the transparency of line patterns on said photomask of each domain is changing gradually along the longitude direction at the same rate, but at a different rate for each different domain.

* * * * *